Jan. 3, 1967  L. A. URBAN  3,295,315
FUEL CONTROL
Filed May 22, 1964  3 Sheets-Sheet 1

INVENTOR
LOUIS A. URBAN
BY Norman Friedland
ATTORNEY

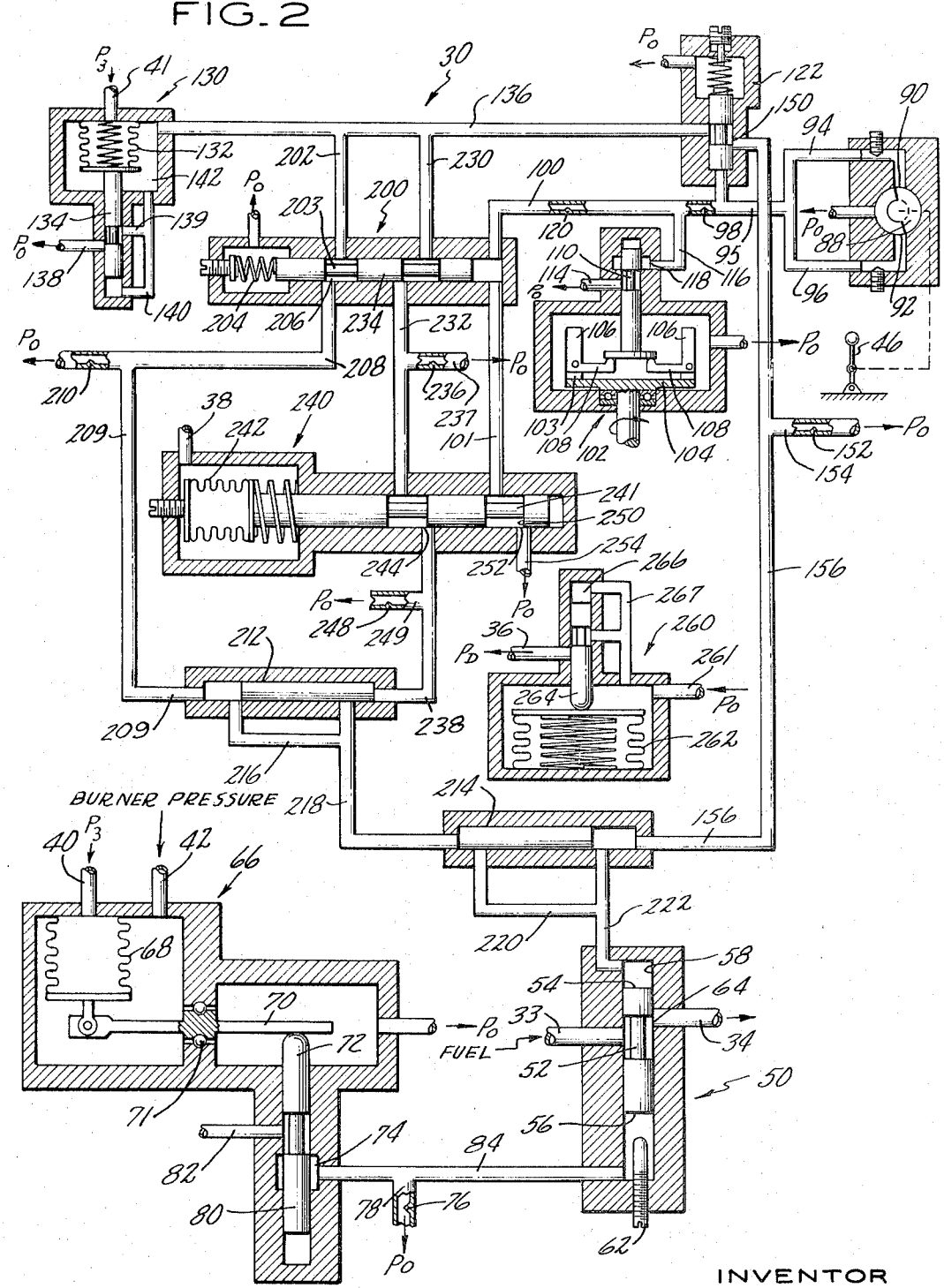

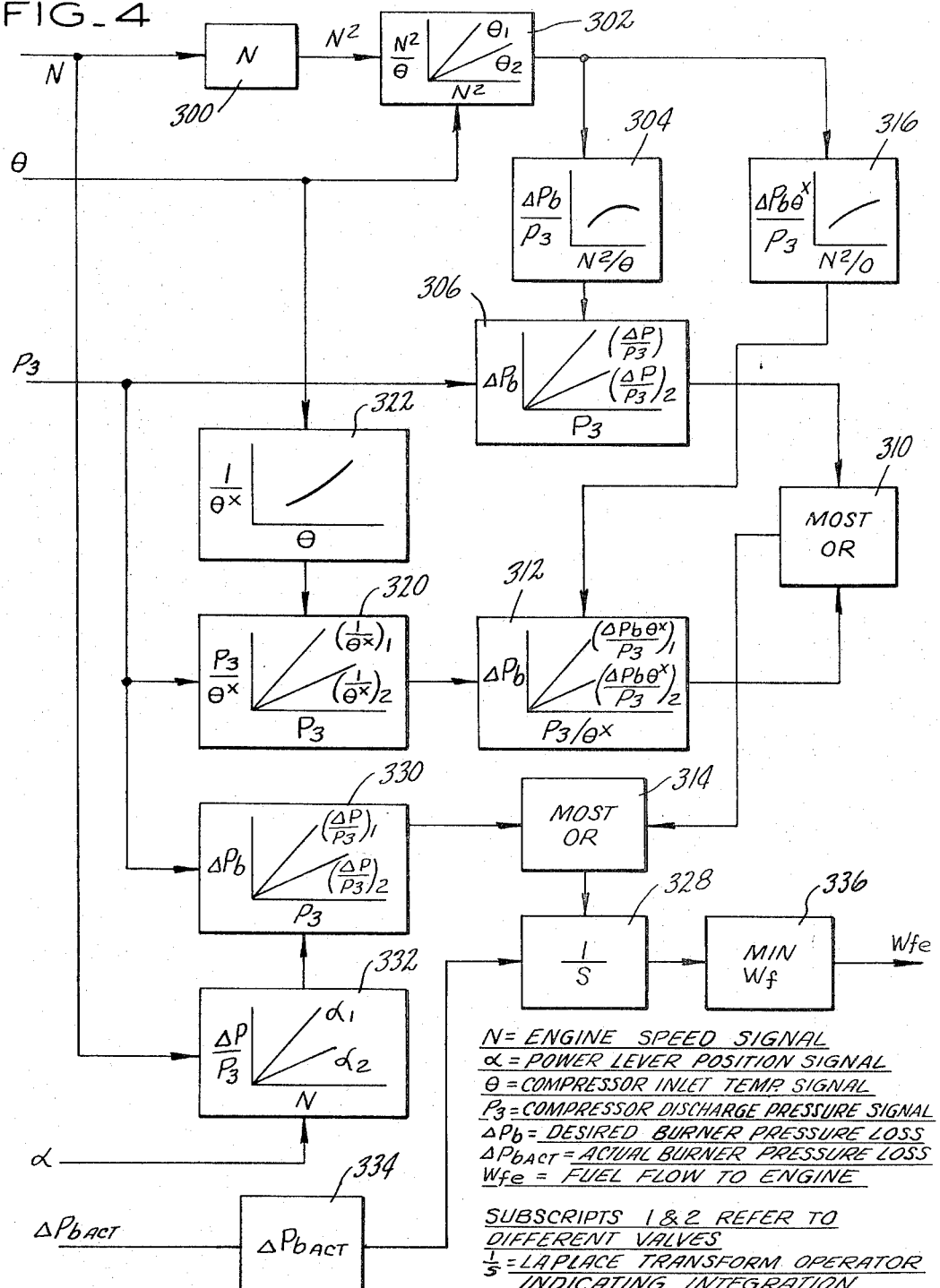

United States Patent Office 3,295,315
Patented Jan. 3, 1967

3,295,315
FUEL CONTROL
Louis A. Urban, Granby, Conn., assignor to United Aircraft Corporation, East Hartford, Conn., a corporation of Delaware
Filed May 22, 1964, Ser. No. 369,418
12 Claims. (Cl. 60—39.28)

This invention relates to fuel controls and more particularly to fuel controls for controlling turbine types of power plants.

As is generally well-known in the art, the fuel control is a combination of metering devices and computing mechanisms serving to control the flow of fuel to the engine in an amount commensurate with efficient and optimum engine operation yet assuring that a malfunction due to surge, rich or lean flame-out and over-temperature does not ensue. Over-temperature in this instance means that temperature which will adversely affect the components of the engine. Basically the metering system of the fuel control selects the rate of fuel flow to be supplied to the engine burners in accordance with the amount of thrust or horsepower demanded by the pilot but subject to engine operating limitations as scheduled by the computing system as a result of its monitoring various engine operational parameters. As is realized, the computing system of the fuel control senses and combines the various parameters to control the output of the metering section during all regimes of engine operation.

As was disclosed in the U.S. application Serial No. 314,755, filed on October 8, 1963 (issued into Patent No. 3,242,673) and assigned to the same assignee, engine scheduling is accomplished by relating all the operational parameters being monitored by the fuel control in terms of scheduled ratio of $\Delta P_b/P_3$ where $\Delta P_b$ is the difference between compressor discharge pressure and turbine inlet pressure and $P_3$ is compressor discharge pressure. It may be pointed out here that this ratio of $\Delta P_b/P_3$ is a value "built into" the fuel control and that this value represents the desired engine operation, hence the ratio of $\Delta P_b/P_3$ may be considered to be a scheduled value which for any given speed of the engine's rotor defines all the operations of the engine.

In a fuel control utilizing the $\Delta P_b/P_3$ control parameter the computing mechanism senses the various monitored engine operation parameters and converts these parameters to a signal proportional to desired engine $\Delta P_b/P_3$. The fuel control also senses the engine's actual $\Delta P_b/P_3$, compares the actual value with the desired value and uses the error or difference between the two to modify engine fuel flow until the actual value is equal to the desired value. Basically such a system describes the control philosophy for both acceleration and steady-state engine operation.

As is known in this art, the highest obtainable rate of acceleration is always desirable in turbine types of power plants and obviously this is accomplished by metering maximum amount of fuel to the engine burner. Owing to the fact that the component parts of the engine can only tolerate a certain maximum temperature and that the compressor is subject to surge or pressure pulsations, the computing system must assure that these conditions as well as rich and lean flame-out do not ensue. These regimes of operation are computed by the fuel control computing system which senses and combines various engine operating parameters.

Conventionally mechanized systems utilize a 3-D cam or 3-D cam equivalent for computing the fuel rate necessary to avoid the maximum temperature and surge. The 3-D cam is best described as a cam having movement in an axial and rotational direction in response to selected engine operation conditions and operates to give the temperature and surge limits. As mentioned above, the fuel control computing system must compute the value of the preselected engine operational parameters in terms of $\Delta P_b/P_3$ ratio so that it will be compatible with the fuel metering system. The 3-D cam serves this purpose for acceleration scheduling. This is accomplished having the cam move in one direction in response to compressor speed and having it move in another direction in response to compressor inlet temperature. The cam follower responding to the radius of the cam develops a signal whose value corresponds to the desired $\Delta P_b/P_3$ value.

The cam's profile comprises a plurality of curves superimposed thereon defining the engine's operational characteristics in terms of $\Delta P_b/P_3$ as a function of inlet temperature of the compressor and compressor speed. To more fully appreciate the present invention it is worthy to note that the engine surge and temperature characteristics can be defined for all engine operations in terms of $\Delta P_b/P_3$ vs. engine speed. In such a plot it will be appreciated that both surge and temperature form a family of curves where each curve of the family depends on the value of the compressor inlet temperature. As is obvious to one skilled in this art the turbine inlet temperature for any given speed of the compressor and value of $\Delta P_b/P_3$ varies as a function of compressor inlet temperature.

Surge and temperature limits are each represented by a family of curves for the over-all engine operation. The conventional 3–D cam has been the only known practical device capable of defining a schedule representing separate families varying as a function of two independent input signals. It is a purpose of this invention to completely eliminate the 3–D cam yet obtain accurate acceleration limit scheduling mechanism. I have found that this is made possible by utilizing $$\frac{\Delta Pb\theta_{t2}^x}{P_3} \text{ vs. } \frac{N}{\sqrt{\theta_{t2}}} \text{ or } \frac{N^2}{\theta_{t2}}$$

as the control parameters instead of $\Delta P_b/P_3$ vs. $N$; where $N$ equals the r.p.m. of the engine rotating mechanism, $\theta_{t2}$ is proportional to temperature of the air entering the compressor, and $x$ equals an exponential value.

By utilizing $$\frac{\Delta Pb\theta_{t2}^x}{P_3} \text{ vs.} \frac{N^2}{\sqrt{\theta_{t2}}}$$

as the control parameters, the maximum temperature limit schedule and the surge limit can each be represented by a single function of the parameters. This is a complete departure from the heretofore fuel control philosophy since, as was described above, the family of curves representing surge and temperature become nonexisting. Owing to this fact the need of a 3–D cam is completely eliminated.

It will be appreciated that the elimination of the 3–D cam is a major breakthrough in this art not only because it eliminates a costly item but also because it allows independent and separate scheduling of the temperature and surge limits of the acceleration schedule. Hence, adjustment of either the surge or temperature limit schedule can be accomplished independently.

Other features and advantages will be apparent from the specification and claims and from the accompanying drawings which illustrate an embodiment of the invention.

FIG. 2 is a schematic illustration showing a fuel control utilizing the concept of this invention.

FIG. 4 is a block diagram schematically illustrating the basic concept of this invention.

Figure 1:
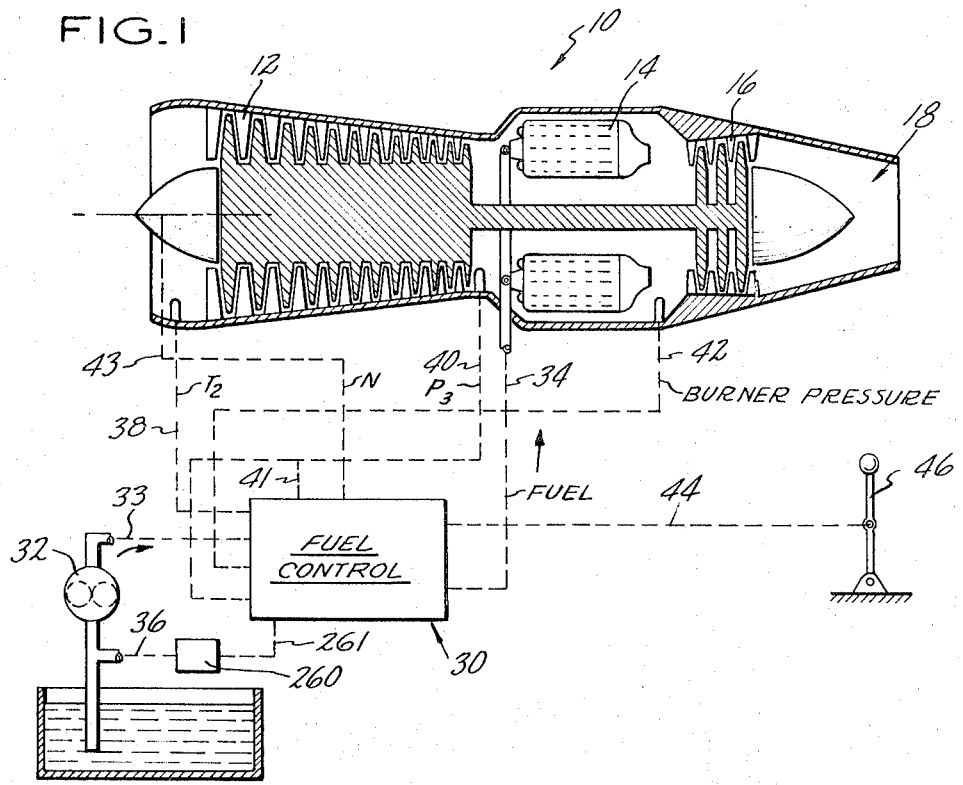
FIG. 1 is a schematic illustration showing a fuel control controlling a jet engine.

In order to appreciate this invention it is necessary to understand that the surge limit schedule can be represented by a single function of the parameters $\Delta P_b/P_3$ and $$\frac{N}{\sqrt{\theta_{t2}}}$$

and that the maximum temperature schedule can be represented by a single function of the parameters $$\frac{\Delta P_b \theta_{t2}^x}{P_3} \text{ and } \frac{N}{\sqrt{\theta_{t2}}}$$

First, looking at the surge characteristics, as is appreciated by those skilled in the art, at any particular corrected r.p.m.

$$\left(\frac{N}{\sqrt{\theta_{t2}}}\right)$$

compressor surge will ensue when a particular value of compressor pressure ratio $(P_3/P_2)$ is exceeded regardless of the engine inlet condition. Since $$\Delta P_b/P_3, \ P_3/P_2 \text{ and } \frac{N}{\sqrt{\theta_{t2}}}$$

are all corrected parameters and since any two corrected parameters are necessary and sufficient to define all other corrected parameters in steady-state operation (and more generally all corrected parameters upstream of the turbine in steady-state or transient) then $\Delta P_b/P_3$ and corrected r.p.m.

$$\left(\frac{N}{\sqrt{\theta_{t2}}}\right)$$

serve to define compressor pressure ratio $(P_3/P_2)$ and hence the surge limit. That is to say, a single line function of $$\Delta P_b/P_3 \text{ vs. } \frac{N}{\sqrt{\theta_{t2}}}$$

serve to define the engine surge limit. Second, looking at the maximum temperature limit characteristic, the following mathematical derivation shows how the engine characteristics have been computed to show that a single line function of $$\frac{\Delta P_b \theta_{t2}^x}{P_3} \text{ vs. } \frac{N}{\sqrt{\theta_{t2}}}$$

will hold actual turbine inlet temperature at a constant value for any value of engine inlet temperature. Small second order effects have been ignored in the derivation.

The following notations are used in the derivation:

$\frac{N}{\sqrt{\theta_{t2}}}$ = Corrected compressor speed in r.p.m.

$\theta_{t2}$ = Proportional to compressor inlet temperature $\frac{\Delta P_b}{P_3}$ = Burner pressure loss ratio $\Delta P_b$ = Burner total pressure loss $\frac{T_{t4}}{\theta_{t2}}$ = Corrected turbine inlet temperature in °R $M_3$ = Compressor outlet (burner inlet) Mach number $\Delta T_b$ = Burner temperature rise $\frac{\Delta T_b}{T_{t3}}$ = Burner temperature rise ratio $N_{Rb}$ = Burner Reynolds number $W_a$ = Actual engine inlet air flow in lbs./sec.

$T_{t3}$ = Actual compressor discharge temp. in °R $P_3$ = Compressor discharge pressure in p.s.i.a.

$A_3$ = An area at the burner inlet in ft.²

$g$ = Gravitational constant in ft./sec.²

$K$ = Ratio of specific heats $Cp/Cv$ $R$ = Gas constant in ft.-lb./°R./lb.

$\Gamma_4$ = Turbine inlet flow number $P_{t4}$ = Turbine inlet pressure in p.s.i.a.

$\theta = \frac{T_{actual}}{T_{standard}}$

To satisfy the requirement stated above, it is first necessary to establish the interrelationship which exists between the corrected parameter $$\frac{\Delta P_b}{P_3}$$

and corrected turbine inlet temperature $$\frac{T_{t4}}{\theta_{t2}}$$

at any particular corrected engine speed.

As is appreciated by those skilled in the combustor art, the expression (1) $$\frac{\Delta P_b}{P_3} = f\left(M_3^2, \frac{\Delta T_b}{T_{t3}}, N_{Rb}\right)$$

has been found to satisfactorily define combustor pressure loss performance. Mach number is the predominant variable and the momentum pressure loss effect due to the temperature rise is relatively small. The Reynolds number effect often does not appear at all and when it does, the effect is relatively small.

Equation 1 may be expressed as follows:

(2) $$\frac{\Delta P_b}{P_3} = f(M_3^2)$$

The burner inlet Mach number may be expressed as a function of burner inlet (compressor outlet) corrected air flow by the equation (3) $$\frac{W_a\sqrt{T_{t3}}}{P_3} = A_3\sqrt{\frac{gK}{R}} M_3 \left[1 + \frac{K-1}{2}M_3^2\right]^{\frac{K+1}{2(1-K)}}$$

Using the calculus this may be differentiated to the form (4) $$\frac{\partial W_a}{W_a} + \frac{1}{2}\frac{\partial T_{t3}}{T_{t3}} - \frac{\partial P_3}{P_3} = \left[\frac{1-M_3^2}{1+\frac{K-1}{2}M_3^2}\right]\frac{\partial M_3}{M_3}$$

Recognizing the approximate relationship between $T_{t3}$ and $P_3$ this may be expressed as follows:

(5) $$\frac{\partial W_a}{W_a} - \frac{K+1}{2K}\frac{\partial P_3}{P_3} = \left[\frac{1-M_3^2}{1+\frac{K-1}{2}M_3^2}\right]\frac{\partial M_3}{M_3}$$

Using the calculus to differentiate Equation 1 to obtain the following equation (6) $$\frac{\frac{\Delta P_b}{P_3}}{\frac{\Delta P_b}{P_3}} = 2\frac{\partial M_3}{M_3}$$

Combining Equations 5 and 6

$$(7) \quad \frac{\frac{\partial \Delta P_b}{P_3}}{\frac{\Delta P_b}{P_3}} = \left[\frac{1+\frac{K-1}{2}M_3^2}{1-M_3^2}\right]\left[2\frac{\partial W_a}{W_a} - \frac{K+1}{K}\frac{\partial P_3}{P_3}\right]$$

Turbine inlet air flow is commonly expressed as a flow number Γ4, where $$(8) \quad \Gamma_4 = \frac{Wg\sqrt{T_{t4}}}{A_4 P_{t4}}$$

Using the calculus this may be differentiated to the form $$(9) \quad \frac{\partial \Gamma_4}{\Gamma_4} = \frac{\partial Wg}{Wg} + \frac{1}{2}\frac{\partial T_{t4}}{T_{t4}} - \frac{\partial P_{t4}}{P_{t4}} - \frac{\partial A_4}{A_4}$$

Recognizing that the turbine inlet area is of fixed geometry; that at constant corrected engine speed $$\frac{N}{\sqrt{\theta_{t2}}}$$

(a condition of the original problem statement) both turbine inlet and engine inlet air flows are subject to very little change due to changes in the engine operating point; and that the rate of change of $P_{t4}$ is essentially equal to the rate of change of $P_3$, Equation 9 may be simplified to $$(10) \quad \frac{\partial P_3}{P_3} = \frac{1}{2}\frac{\partial T_{t4}}{T_{t4}}$$

and Equation 7 may be simplified to $$(11) \quad \frac{\frac{\partial \Delta P_b}{P_3}}{\frac{\Delta P_b}{P_3}} = -\frac{K+1}{2K}\left[\frac{1+\frac{K-1}{2}M_3^2}{1-M_3^2}\right]\frac{\partial T_{t4}}{T_{t4}}$$

Using the corrected quantity equivalents of the parameters, Equation 11 may be expressed as $$(12) \quad \frac{\frac{\partial \Delta P_b}{P_3}}{\frac{\Delta P_b}{P_3}} = -\frac{K+1}{2K}\left[\frac{1+\frac{K-1}{2}M_3^2}{1-M_3^2}\right]\frac{\partial \frac{T_{t4}}{\theta_{t2}}}{\frac{T_{t4}}{\theta_{t2}}}$$

Equation 12 then expresses the interrelationship which exists between the corrected parameter $$\frac{\Delta P_b}{P_3}$$

and corrected turbine inlet temperature $$\frac{T_{t4}}{\theta_{t2}}$$

at any particular corrected engine speed $$\frac{N}{\sqrt{\theta_{t2}}}$$

(with minor second order terms being ignored).

In its differential form, Equation 12 may now be expanded to $$(13) \quad \frac{\frac{\partial \Delta P_b}{P_3}}{\frac{\Delta P_b}{P_3}} = -\frac{K+1}{2K}\left[\frac{1+\frac{K-1}{2}M_3^2}{1-M_3^2}\right]\left[\frac{\partial T_{t4}}{T_{t4}} - \frac{\partial \theta_{t2}}{\theta_{t2}}\right]$$

Since the desire is to find a single valve function of $$\frac{\Delta P_b}{P_3}$$

and $\theta_{t2}$ which will hold actual $T_{t4}$ constant regardless of the value of $\theta_{t2}$, $$\frac{\partial T_{t4}}{T_{t4}}$$

must equal zero.

Recognizing this, collecting terms and simplifying $$(14) \quad \frac{\frac{\partial \Delta P_b}{P_3}}{\frac{\Delta P_b}{P_3}} - \frac{K+1}{2K}\left[\frac{1+\frac{K-1}{2}M_3^2}{1-M_3^2}\right]\frac{\partial \theta_{t2}}{\theta_{t2}} = 0$$

Using the arbitrary symbol "x" such that $$(15) \quad x = -\frac{K+1}{2K}\left[\frac{1+\frac{K-1}{2}M_3^2}{1-M_3^2}\right]$$

(which are thermodynamic values of the engine's working medium) and then using the calculus to integrate Equation 14 we find that $$(16) \quad \frac{\Delta P_b \theta_{t2}^x}{P_3} = \text{constant}$$

This is to say, if at any particular value of corrected engine speed $$\frac{N}{\sqrt{\theta_{t2}}}$$

a constant value of $$\frac{\Delta P_b \theta_{t2}^x}{P_3}$$

is maintained in the engine by the control, then actual turbine inlet temperature $T_{t4}$ will not vary regardless of the value of the engine inlet temperature ratio $\theta_{t2}$. The actual value of $$\frac{\Delta P_b}{P_3}$$

maintained in the engine by the control will be $$(17) \quad \frac{\Delta P_b}{P_3} = \frac{P_b \theta_{t2}^x}{P_3} \times \frac{1}{\theta_{t2}^x}$$

As can be seen from Equation 15 the "x" exponent contains terms related to the compressor discharge (burner inlet) Mach number which itself varies with corrected engine speed for any particular turbine inlet temperature. However, both this change in Mach number and the effect of this change on the numerical value of "x" are so small that for most engines it would be sufficiently precise to use a universally constant value of "x" irrespective of corrected engine speed, or for that matter, of engine size or type. The control is so designed, however, that if desired or required "x" can be made variable.

Referring more particularly to FIGURE 1 which shows a turbine type of engine generally indicated by numeral 10 comprising section 12, burner section 14, turbine section 16 receiving the exhaust gases discharging from the burner for driving the compressor and tailpipe section or nozzle section 18.

The fuel control generally illustrated by numeral 30 serves to meter fuel being pressurized by pump 32 to burner section 14 through line 34. Manifold drain line 261, absolute pressure control 260 and drain line 36 serve to return fuel from the fuel control to the inlet of pump 32. As will be more fully illustrated hereinafter, the fuel control receives several signals from the parameters selected to compute the desired amount of fuel necessary to obtain optimum operation. For this prpose, the fuel control senses the compressor inlet temperature as illustrated via sensing line 38, compressor discharge pressure via line 40, burner discharge pressure via line 42, r.p.m. of the compressor via line 43, and power lever position via line 44. It is to be understood that the power lever is mounted somewhere available to the operator of the aircraft and the terminology "power lever" is not particularly limited to a particular lever in the cockpit of the aircraft. Rather, it is intended to cover any linkage connecting the cockpit to the fuel control whether it be referred to as a "go handle," "power lever," or throttle lever or the like. Furthermore, it is to be understood that the use of a simple jet type of engine is shown merely for illustrative purposes and is not to be construed as being limited thereto. As will be obvious to one skilled in the art, this concept is equally applicable to control fan jets, turboprop jets, regenerative types of jet engines whether it is of the solid spool, split spool or the free turbine type of engine. It will be appreciated that for a regenerator type of power plant it is preferred to sense the pressure upstream of the regenerator and downstream of the burner to obtain the burner pressure drop signal.

As illustrated in FIGURE 2, fuel is admitted to throttle valve generally indicated by numeral 50 through line 33 where it is metered to the engine via passage 34. (It will be understood that like numerals reference like parts in the various drawings.) Throttle valve 50 comprises spool 52 having its ends 54 and 56 subjected to metered pressures for positioning the spool in cylinder 58. Metering edge 60 of spool 52 cooperates with port 62 for establishing the proper area for metering the required amount of fuel to the engine. The maximum travel of spool 52 is governed by adjustable stop 64 which serves to define the minimum opening of port 62 for establishing the minimum fuel flow to the engine. It may be desirable to maintain the pressure drop across the throttle valve at a constant value, particularly during the minimum fuel flow schedule. A suitable pressure control is shown in the 2,822,666 patent supra.

Hydraulic pressure, whose value is proportional to the actual pressure drop across the burner, is admitted into cylinder 58 to act on end 56 of spool 52. This pressure is established by the burner pressure drop sensor generally indicated by numeral 66 which comprises bellows 68 having its free end suitably connected to lever 70. Pressure through line 40 is admitted internally of bellows 68 and pressure through sensing line 42 is admitted to act externally over bellows 68. Obviously, the force on lever 70 will be indicative of the difference between the two pressures so that the signal produced by the movement of lever 70 is proportional to the pressure drop across the burner. The free end of lever 70 acts against pilot valve 72 by virtue of its rotational movement about pivot 71 which valve serves to meter pressure across port 74 for regulating the pressure drop across fixed restriction 76 disposed in drain line 78. Hence, the relationship between land 80 and port 74 of valve 72 define an area for admitting fluid from supply line 82 which receives fluid from line 136 into passage 84. This cooperation is such that the pressure in line 84 acting on end 56 of spool 52 is a function of the actual pressure drop across the burners.

Figure 3:
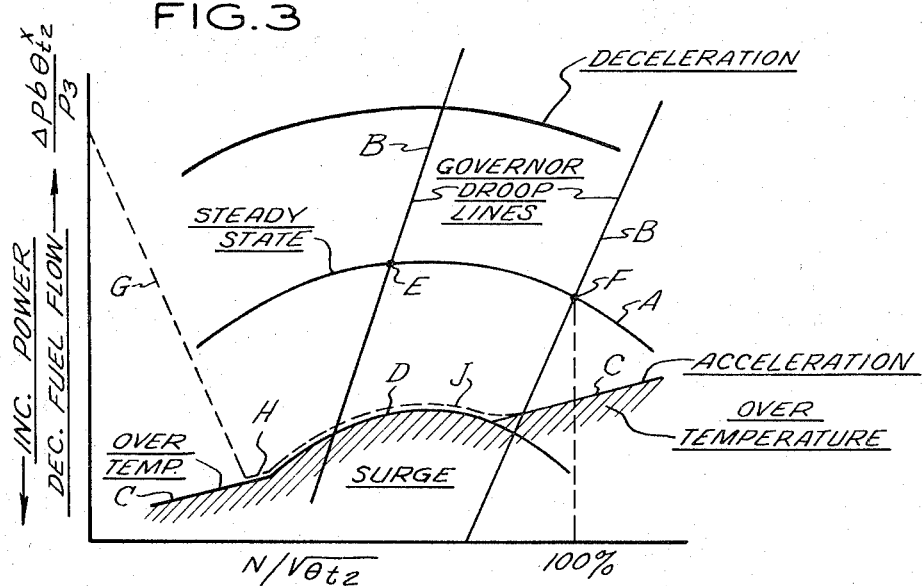
FIG. 3 is a graphical illustration showing a typical operating condition of the fuel control.

In order to more fully understand this invention, the description that will immediately follow will be concerned with the mechanism for holding the operation of the engine at its steady-state value. Referring for the moment to FIGURE 3, which is a plot of the ratio of the pressure drop across the burner to compressor discharge pressure versus the corrected speed of the compressor, curve A represents the steady-state operation of the engine, curve B represents an infinite number of droop governor lines which are characteristic of the operation of the governor, curve C represents the corrected temperature of the engine ($T_4/\theta_2$) and curve D represents surge. Assume for illustration purposes that it is desired to control the engine at point E which falls on the steady-state line at the point where line B intersects line A and assuming that this is at 50% of the desired speed of the compressor. To obtain this value, pilot lever 46 is rotated to position valve 88 which varies the area of orifices 90 and 92 for dumping fluid out of lines 94 and 96 and establishing a pressure therein equivalent to the power desired when the pressure in passage 100 corresponds to 50% actual compressor speed. Setting the area of orifices 90 and 92 serves to control the pressure ratio between the pressure in passages 100 and 95 disposed upstream and downstream of orifice 98 respectively. From the foregoing, it is apparent that the pressure evidenced between orifice 98 and orifices 90 and 92 is a function of the displacement or position of throttle lever 46 and the pressure in passage 100, and essentially is the speed signal at which the compressor is desired to rotate.

The governor generally indicated by numeral 102 serves to measure the speed of the compressor and produce a signal indicative of the actual speed of the compressor. Governor 102 contains rotating platform 104 carrying a pair of flyweights 106 pivotally mounted on upstanding members 103, each of which contain arms 108 bearing against spool 110 of speed control valve 112. The force created by the flyweights is a function of speed squared. This valve serves to meter high pressure fluid issuing from line 114 into passage 100 via port 118 and branch line 116, and the metering edge of spool 110 establishes an area for metering high pressure fluid into port 118 for producing a pressure in line 116 to be equivalent to a function of the square of the speed of the compressor. Fluid leaking around spool 110 seeks to the upper side thereof to counteract the force created by the flyweights. The metering edge of spool 118 may be considered as a variable area orifice and its variation in area controls and establishes the pressure drop across itself to create a pressure in passage 100 which when applied to the upperside of spool 110 balances the flyweight force. Hence, it is apparent that the pressure acting on the upperside of pilot valve 110 is a function of actual speed.

Still referring to FIGURE 2, it will be further noted that compressor discharge pressure is sensed by compressor discharge sensor generally indicated by numeral 130 which comprises bellows 132 and control valve 134. Compressor discharge pressure transmitted via line 41 is admitted internally of bellows 132 which is surrounded by hydraulic fluid. The free end of the bellows abuts against the end of control valve 134 to position it as a function of the value of the compressor discharge pressure. Hence, the pressure in passage 136 is established to be a function of compressor discharge pressure. This is accomplished by metering pressure from the high supply pressure line 138 through valve 134 into lines 139 and 140 connected to chamber 142. Valve 134 displaces until the pressure in chamber 142 counteracts the spring force and the pressure internally of the bellows. When valve 134 is in its balanced position, that is, when it no longer continues to travel, the pressure in chamber 142 and hence line 136 has been established. It will be noted that the under end of valve 134 is counteracted by the pressure equivalent to the pressure in chamber 142 by the interconnection made via lines 139 and 140. This assures that the pressure established by valve 134 is solely a function of compressor discharge pressure.

The metering land of valve 122 cooperating with port 150 is designed so that its area is a function of the scheduled pressure drop across the burner divided by the compressor discharge pressure. By virtue of the relationship of orifice 150 with respect to orifice 152 which is disposed in line 154 leading fluid to drain, a multiplication is effectuated which results in a pressure in passage 156 which is a function of the product of the pressure in passage 136 and the ratio of orifice areas 150 to 152. Hence, compressor discharge pressure component is canceled so that pressure in line 156 is solely in terms of the desired pressure drop across the burner which has been established as a function of speed of the compressor, pilot lever position and compressor discharge pressure.

This pressure is fed into cylinder 58 to act on end 54 of spool 52 of the throttle valve. This pressure counteracts the force created by the pressure on end 56 of the throttle valve and the throttle valve being of the integrating type, spool 52 translates at a velocity which is a function of the magnitude of the error between the two pressures. This causes flow to be metered through the throttle valve to the engine until the pressures on either end of spool 52 are balanced. When this occurs, the engine will be operating at point E as shown in FIGURE 3.

Now that the steady-state operation of the control has been described, the next portion of the specification will be concerned with describing the acceleration schedule of the control which permits the throttle valve to regulate fuel to the engine while preventing the engine from becoming overheated and preventing the compressor from operating in the surge region. This is illustrated in FIGURE 3 by curves C and D respectively.

Still referring to FIGURE 2, it will be noted that fluid in line 136 is directed to the valve generally indicated by numeral 200 via line 202, which pressure has been established by the compressor discharge pressure sensor 130. Valve 200 comprises spool 203 subjected to the forces of spring 204 acting on one of its ends and a controlled pressure acting on the opposing end. Metering edge 206 on spool 203 is so designed that it meters fluid discharging from valve 200 into line 208 so that the pressure in line 208 is a function of the scheduled surge limiting value of the pressure drop across the burner. As will be more fully explained hereinafter, the pressure creating the force acting on one side of spool 203 is a function of corrected speed or speed squared divided by temperature of the inlet of the compressor. Metering land 206 is designed so that it is a function of the scheduled surge limiting value of the pressure drop across the burner divided by compressor discharge pressure. As it meters flow from line 202, which is indicated above is a function of compressor discharge pressure, a multiplication effect takes place in a manner similar to that described in connection with valve 122. This multiplication, in essence, is a multiplication of the burner pressure drop divided by compressor discharge pressure times compressor discharge pressure, thus canceling out the compressor discharge pressure term so that the pressure between restriction 210 and the metering land 206 is solely a function of scheduled burner pressure drop. Its value is the point where surge would ensue if the ratio of the burner pressure to compressor discharge pressure goes below a predetermined value; namely, that shown as curve D as shown in FIGURE 3. Hence, if the pressure should go below line D when operating within a specific speed range, surge would ensue.

It will be noted from the drawing that the fluid in line 208 is directed via line 209 to temperature-surge-selector valve 212 and the acceleration-governor-selector valve 214. In the position as shown in FIGURE 2, the temperature-surge-selector valve 212 is placed in the extreme right position. This is due to the fact that the pressure on the left-hand end is at a higher value than the pressure on the right-hand end. In this position, line 216 communicates with lines 209 and 218 for directing this pressure to act on the left-hand end of acceleration-governor-selector valve 214. Since the right-hand end of acceleration-governor-selector valve 214 is subjected to the pressure in line 156, which as described above, is a function of the scheduled burner pressure drop, which, in turn, is a function of the ratio of burner pressure drop to compressor discharge pressure, it will shift to the right if the burner pressure drop goes below line D (see FIG. 3). Hence, if the force created by the pressure generated by valve 200 evidenced on the left-hand end of acceleration-governor-selector valve 214 increases over the force acting in an opposing direction, the valve will shift to the right connecting lines 220 and 222 with line 218 for applying that pressure on end 54 of throttle valve 50. This has the effect of urging spool 52 of throttle valve 50 in a downward direction to prevent the weight flow of fuel to the engine from exceeding a value which would cause the engine to surge and hence, maintain the operation of the engine above line D which is the surge limit of engine operation.

Control valves 200 and 240 cooperate to assure that the engine does not go above a maximum temperature. Control valve 200 meters compressor discharge pressure fluid through line 230 into line 232. The contour of metering edge 234 of spool 203 is designed so that it defines an area of cooperating metering port as a function of desired burner pressure drop divided by compressor discharge pressure and compressor inlet temperature raised to some power. As was mentioned in connection with the operation of the metering edge 206 in connection wtih the fixed restriction 210, the operation of metering edge 234 in connection with restriction 236 disposed in drain line 237 is such that the value of the pressure in line 232 is the product of the multiplication between the pressure of line 230 which is a function of compressor discharge pressure and the function of the area of the metering edge 234. This multiplication produces a pressure in line 232 equal to a function of the pressure drop across the burner times the temperature at the inlet of the burner raised to some power.

Control valve 240 serves to place the pressure in line 238 in terms compatible with the term used in controlling the throttle valve 50. Schematically illustrated, valve 240 responds to the position of bellows 242 which is acted on by compressor inlet temperature air and produces a signal whose valve is equivalent to the temperature at the inlet of the compressor. This signal then translates spool 241 of valve 240 for controlling the area created by metering edge 244. This area is made to vary as a function of the reciprocal of the temperature of the inlet of the compressor raised to some power. Its relationship with the fixed restriction 248 disposed in drain line 249 which is similar to the relationship described in connecton with the area established by metering edge 206 and restriction 210 produces a multiplication between the terms represented by the pressure in line 232 and the term introduced by metering edge 244. Hence, the factor of temperature represented by the pressure in line 232 is canceled out in line 238 so that the pressure in line 238 becomes solely a function of the desired pressure drop across the burner. Since this pressure acts on the right-hand end of temperature-surge-selector valve 212, it will cause the valve to shift to the left interconnecting line 238 and line 218 to cause this pressure to act on the left-hand end of acceleration-governor-selector valve 214 when it exceeds the pressure acting on the left-hand end. In essence, then, if the temperature should exceed the value represented by curve C of FIGURE 3, the pressure on the left-hand end of acceleration-governor-selector valve will exceed the pressure acting on the right-hand end, causing the valve to shift to the right interconnecting lines 218 and 222 and chamber 58 subjecting end 54 of throttle valve 50 to that pressure. This pressure prevents the throttle valve from metering a fuel flow which would result in over-temperaturing the engine by maintaining system operation above curve C on FIGURE 3.

Curve C is a line of constant corrected turbine inlet temperature and for a specified value of inlet temperature describes a specific turbine inlet temperature limit. The control system described herein utilizes a mathematical expression which defines a relationship between a specific value of turbine inlet temperature and burner pressure drop divided by burner pressure multiplied by compressor inlet temperature raised to a power at a specified value of corrected speed. Hence, for each value of corrected speed, a constant turbine inlet temperature can be described as a function of burner pressure drop divided by burner pressure and compressor inlet temperature raised to a power as illustrated in FIGURE 3. As can be seen from FIGURE 3, curve D represents the surge limit and the area defined under the curve represents the surge region, i.e., where surging of the compressor would ensue. Curve C represents the temperature limit and the area defined under this curve represents the over-temperature region.

The pressure acting on the right-hand end of spool 203 of valve 200 is established by valve 240 and governor 102 which, as indicated above, positions the spool as a function of temperature at the inlet of the compressor and speed of the compressor. Metering edge 250 of valve spool 241 cooperates with port 252 defining an area equal to a function of the temperature of the inlet of the compressor. The opening thereof bleeds pressure from line 101 to drain via line 254 for controlling the pressure drop across restriction 120. This has the effect of establishing a presure downstream of restriction 120 to be equivalent to a value which is a function of speed squared divided by the temperature of the inlet of the compressor. The combined effect of valves 200 and 240 establishes a maximum temperature line and relates this temperature limit in terms compatible with the terms controlling the throttle valve; namely, making that pressure equivalent to a function of the scheduled value of the pressure drop across the burner.

Since it is desirable to compute the terms of the parameters in their absolute values rather than gauge pressure values, absolute pressure control 260 is employed. This control is located in the drain line (all the drain lines indicated by $P_0$ in the drawings) for controlling the drain pressure of all the control valves to equal the absolute value established by evacuator bellows 262. Bellows 262 acts against spool 264 which is counterbalanced by drain pressure admitted into chamber 266 via line 267. It will be appreciated that the various drain lines lead drain fluid back to the input of the pump (see FIG. 1). Pressure control 260 is located in the drain manifold line 261 and serves to meter drain fluid into drain line 36. This establishes a datum line equivalent to an absolute value so that the pressure control values use a zero pressure datum rather than a gauge pressure datum.

In summary, therefore, the control assures operation of the engine as shown in the graph of FIGURE 3. For steady-state operation, the pilot lever 46 establishes the desired power by producing a signal which is converted into a pressure value. This signal can be considered as the desired speed of the compressor. Governor 102 serves to measure actual speed and convert it to a pressure signal which is equal to a function of the square of compressor speed. Both of these pressure signals are mixed and the resultant pressure is sensed by valve 122. The change in this pressure from a set point is equivalent to the error between actual speed and desired speed.

Valve 122, then converts this signal in terms of the control parameter $$\frac{\Delta P_b}{P_3}$$

by varying the area of its metering orifice as a $$f\left(\frac{\Delta P_b}{P_3}\right)$$

Actual $P_3$ is measured by control 130 and produces a pressure equal to a $f(P_3)$ which is applied to the metering orifice of valve 122. Here the functions are multiplied so that the output of valve 122 is a fluid pressure whose value is a desired or scheduled $f(\Delta P_b)$.

This value represents the ratio $$\frac{\Delta P_b}{P_3}$$

of the control parameter, but is in a simplified term expressing the scheduled power (by virtue of power lever position, speed and compressor discharge pressure) at which the engine is desired to operate.

The actual burner pressure drop is measured by control 66 and converts its signal to a fluid pressure which is a $f(\Delta P_b)$. This represents the actual pressure drop across the burner. It will be noted that the term $f(\Delta P_b)$ obtained by the power lever, compressor discharge pressure sensor, and governor represents the scheduled pressure drop across the burner. The integrating throttle valve senses the difference between both values and changes fuel flow to the engine until both pressures have been balanced which is at the steady-state operation point.

The acceleration schedule is designed to allow fuel to be metered to the engine at its highest flow capacity but yet preventing the temperature to increase beyond the structural limits of the engine's component parts and preventing the compressor from operating within the surge region. This is represented in FIGURE 3 by curves C and D. It will be noted that the present fuel control computes both the temperature limit $T_4$ and surge limit and allows the higher of the two signals to control. That is to say that the two values (temperature and surge) are computed in terms of the control parameter and the higher $$\frac{\Delta P_b}{P_3}$$

of the two controls.

To compute the surge schedule, pressure equivalent to a $f(P_3)$ as generated by control 130 is fed to valve 200 which generates the scheduled $f(\Delta P_b)$ surge signal. This is accomplished by designing the metering land to vary its area as a $$f\left(\frac{\Delta P_b}{P_3}\right)$$

surge. The valve multiplies this function by $f(P_3)$ to produce the $f(\Delta P_b)$ surge pressure value. The position of this valve is varied as a $f(N^2/\theta_{t2})$ which is established by governor 102 and valve 240. It will be noted that the $f(N^2/\theta_{t2})$ is the abscissa of the chart shown in FIGURE 3.

Hence, it is apparent from the foregoing that valve 200 produces a pressure which is a function of the control parameter $$\frac{\Delta P_b}{P_3} \text{ and } \frac{N}{\sqrt{\theta_{t2}}}$$

so that the curve D can be defined in control functions.

The overtemperature is limited in accordance with curve C of FIGURE 3 by valves 240 and 200. It will be noted that curve C represents turbine inlet temperature corrected by compressor inlet temperature, $T_4/\theta_{t2}$. The curve shown in FIGURE 3 illustrates the relationship utilized by this control system.

To this end, the schedule for overtemperature is governed by valve 200 which is positioned as $f(N^2/\theta_{t2})$ representing the abscissa of the graph in FIGURE 3. (Note the plot of the graph is in terms of $$\frac{N}{\sqrt{\theta_{t2}}}$$

which is merely a different expression for the same equation.) The metering land of spool 203 of valve 200 defines an area of its metering port to be a $$f\left(\frac{\Delta P_b}{P_3}\theta_{t2}^x\right)$$

which establishes the desired turbine inlet temperature limit. This valve also multiplies the pressure signal $f(P_3)$ by this function to produce a pressure value equal to a $f(\Delta P_b \theta_{t2}^x)$.

The area of the orifice defined by metering land 244 of valve 240 varies as a $$f\left(\frac{1}{\theta_{t2}^x}\right)$$

and this valve serves to multiply this function by $f(\Delta P_b \theta_{t2}^x)$. This produces a pressure signal in terms compatible with the terms of the pressure signal applied to the throttle valve; namely, $f(\Delta P_b)$.

Valve 212 then senses both the surge signal and the overtemperature signal and directs pressurized fluid equivalent to the function of the higher value to valve 214. Valve 214 then senses this signal and compares it with the desired steady-state signal and directs the greater of the two to throttle valve 50. In this manner, the limits to prevent surge and overtemperature are provided, and the acceleration schedule is established.

Referring to FIG. 4, block 300 represents a suitable speed sensing device receiving an input speed signal and converting it to a function of the square of the speed ($N^2$). This signal is then fed into block 302 representing a divider which also received a second input signal $\theta_{t2}$ responsive to the temperature at the inlet of the compressor. There these two signals are divided to produce an output signal equal to a function of $N^2$ divided by $\theta_{t2}$. This signal then becomes the input signal to the function generator illustrated by block 304. It converts the signal to a value which is a function of $$\frac{\Delta P_b}{P_3}$$

This signal is then multiplied in the multiplication box represented by number 306 which multiplies this value by a signal equivalent to a function of $P_3$. Block 306, multiplying these two values, then develops a pressure signal proportional to the desired $\Delta P_b$. This signal is then fed to a gate-type of mechanism which senses another $\Delta P_b$ signal developed by block 312. Gate mechanism 310, sensing these two input signals, delivers the higher value of the two to a second gate mechanism 314. Block 312 represents a multiplier which multiplies the two input signals $$\frac{P_3}{\theta_{t2}^x}$$

and $$\frac{\Delta P_b \theta_{t2}^x}{P_3}$$

The $$\frac{\Delta P_b \theta_{t2}^x}{P_3}$$

signal is developed by function generator illustrated by block 316 as follows. Function generator 316 responding to the input signal $$\frac{N^2}{\theta_{t2}}$$

developed by divider 302 modifies it to a value equal to a function of $$\frac{\Delta P_b \theta_{t2}^x}{P_3}$$

which is then transmitted to multiplier 312. The second signal $P_3$ divided by the $\theta_{t2}^x$ which is multiplied by multiplier 312 is generated by function generator 320 by combining two input signals $P_3$ and $\theta_{t2}^x$ (generated by the function generator 322). The function generator 322 receives the input signal $\theta_{t2}$. This signal received by function generator 322, in turn, establishes the signal $\theta_{t2}^x$ which is then combined with the $P_3$ signal and function generator 320 for producing the $P_3$ divided by $\theta_{t2}^x$. The multiplication taking place in the multiplier 312 develops the scheduled $\Delta P_b$ signal which is then transmitted to the gate mechanissm 310. Gate mechanism 314 then compares the two $\Delta P_b$ signals and transmits the higher value of the two to block 328 which represents the metering valve delivering fuel to the engine. The second $\Delta P_b$ signal fed into the gate mechanism 314 is developed by multiplier 330 which multiplies $P_3$ and $$\frac{\Delta P_b}{P_3}$$

(developed by function generator 332). Function generator 332 serves to combine a signal which is proportional to the power lever setting and a signal which is proportional to speed for producing the $$\frac{\Delta P_b}{P_3}$$

signal. This signal is then transmitted to multiplier 330 which multiplies $P_3$ and $$\frac{\Delta P_b}{P_3}$$

for developing the $\Delta P_b$ signal.

From the foregoing, it is apparent that function generator 332 and multiplier 330 develop the scheduled steady-state $\Delta P_b$ value for controlling the engine during the steady-state operation. Multiplier 312, function generator 316, function generator 322, multiplier 320 serve to generate a $\Delta P_b$ signal which establishes the overtemperature limit for the acceleration schedule. Multiplier 306, function generator 304 serve to generate a $\Delta P_b$ signal for limiting surge of the acceleration schedule. Metering valve 328 is of the integrating type and compares the signal from gate 314 which is proportional to desired $\Delta P_b$ with the signal from block 334 which is proportional to the actual $\Delta P_b$ within the engine. As long as a difference exists between these two signals the valve continues in motion modifying fuel flow to the engine until the actual $\Delta P_b$ in the engine is equal to the desired value. Block 336 represents a low limit stop on the metering valve whose purpose is to prevent fuel from being reduced below such value as would flame-out the engine. For a clearer understanding of the mechanism represented by the various blocks in FIG. 4, a graphical illustration is shown therein to illustrate the desired function of each. For the sake of simplicity and convenience and because the graphical illustrations are obvious to one skilled in the art, a description of each is omitted from herein.

What is claimed is:

1. For a turbojet engine having a compressor, a heat source and a turbine receiving the discharging products from said heat source for driving the compressor, a source of fuel under pressure, connecting means interconnecting said source and said heat source, fuel regulating means in said connecting means for regulating the flow of fuel therein, means responsive to compressor discharge pressure, pressure drop across the heat source, compressor inlet temperature and a parameter of engine operation for controlling said regulating means, said means including computing means for establishing a scheduled value for satisfying the expression $$\frac{\Delta P_b \theta^x}{P_3}$$

where $\Delta P_b$ = desired pressure drop across the heat source
$\theta$ = compressor inlet temperature
$x$ = a thermodynamic value of the engine working medium
$P_3$ = compressor discharge pressure.

2. For a turbojet engine as defined in claim 1 wherein said parameter is the rotational speed of said engine.

3. A fuel control for a turbine type of power plant having a compressor, a heat source, and a turbine receiving the heated working medium discharging from said heat source for driving said compressor, a power lever, a source of fuel under pressure, connecting means in interconnecting said source and said heat source, fuel regulating means in said connecting means for regulating the flow of fuel therein, means responsive to compressor discharge pressure, compressor inlet temperature, and the position of said power lever for controlling said fuel regulating means, said last-mentioned means including computing means for establishing a scheduled value in accordance with the expression $$\frac{\Delta P_b \theta^x}{P_3}$$

varies as a function of another engine parameter where
$\Delta P_b$ = desired pressure across the heat source $\theta$ = compressor inlet temperature
$x$ = a thermodynamic value of the engine working medium
$P_3$ = compressor discharge pressure.

4. For a turbine type of power plant having a compressor, a burner, and a turbine receiving the products of combustion discharging from the burner for driving the compressor, a source of fuel under pressure, connection means interconnecting said source and said burner, fuel regulating means in said connection means for regulating the flow of fuel therein, means responsive to compressor inlet temperature, compressor speed and compressor discharge pressure for controlling said fuel regulating means, said means including computing mechanism for limiting the temperature of the working medium at the inlet of said turbine by establishing a scheduled value for satisfying the expression $$\frac{\Delta P_b \theta^x}{P_3}$$

where
$\Delta P_b$ = desired pressure drop across the burner
$\theta$ = compressor inlet temperature
$x$ = a thermodynamic value of the engine working medium
$P_3$ = compressor discharge pressure.

5. For a turbojet engine having a compressor, a burner, and a turbine receiving the discharging products from said burner for driving the compressor, a source of fuel under pressure, connecting means interconnecting said source and said burner, fuel regulating means in said connecting means for regulating the flow of fuel therein, means responsive to compressor discharge pressure, speed of the engine, and compressor inlet temperature for controlling said regulating means, said means including computing means for establishing a scheduled value for satisfying the expression $$\frac{\Delta P_b \theta^x}{P_3}$$

where
$\Delta P_b$ = desired pressure drop across the burner
$\theta$ = compressor inlet temperature
$x$ = a thermodynamic value of the engine working medium
$P_3$ = compressor discharge pressure
and means responsive to pressure upstream and downstream of said burner for further controlling said fuel regulating means.

6. For a turbojet engine having a compressor, a heat source and a turbine receiving the discharging products from said heat source for driving the compressor, a source of fuel under pressure, connecting means interconnecting said source and said heat source, fuel regulating means in said connecting means for regulating the flow of fuel therein, means responsive to compressor discharge pressure, pressure drop across the heat source compressor inlet temperature and another engine operating parameter for controlling said regulating means, said means including computing means for establishing a scheduled value in accordance with the expression $$\frac{\Delta P_b \theta^x}{P_3}$$

where
$\Delta P_b$ = desired pressure drop across the heat source
$\theta$ = compressor inlet temperature
$P_3$ = compressor discharge pressure $$x = -\frac{K+1}{2K}\left[\frac{1+\frac{K-1}{2}M^2}{1-M^2}\right]$$

where
$K$ = ratio of specific heat of the enginge working medium $M$ = a Mach number of the engine working medium at the compressor outlet.

7. For a turbine type power plant having a compressor, a combustion section and a turbine receiving the products of combustion discharging from the combustion section for driving said compressor, a source of fuel under pressure, connecting means interconnecting said source and said combustion section, fuel regulating means in said connecting means for controlling the flow of fuel therethrough, means responsive to a compressor discharge pressure, compressor inlet temperature and compressor speed for controlling said fuel regulating means, said last-mentioned means including computing means for establishing a scheduled value for satisfying the expression $$\frac{\Delta P_b \theta^x}{P_3}$$

varying as a function of $N/\sqrt{\theta}$ where
$N$ = speed of the compressor
$\Delta P_b$ = desired pressure drop across the burner
$\theta$ = compressor inlet temperature
$x$ = a thermodynamic value of the engine working medium
$P_3$ = compressor discharge pressure.

8. For a turbine type of power plant having a compressor, a burner, and a turbine receiving the products of combustion discharging from the burner for driving the compressor, a source of fuel under pressure, connection means interconnecting said source and said burner, fuel regulating means in said connection means for regulating the flow of fuel therein, means responsive to compressor inlet temperature, compressor speed, pressure differential across said burner and compressor discharge pressure for controlling said fuel regulating means, said means including computing mechanism for limiting the temperature of the working medium at the inlet of said turbine by establishing a scheduled value for satisfying the expression $$\frac{\Delta P_b \theta^x}{P_3}$$

where
$\Delta P_b$ = desired pressure drop across the burner
$\theta$ = compressor inlet temperature
$P_3$ = compressor discharge pressure $$x = -\frac{K+1}{2K}\left[\frac{1+\frac{K+1}{2}M^2}{1-M^2}\right]$$

where
$K$ = ratio of specific heat of the engine working medium
$M$ = a Mach number of the engine working medium at the compressor outlet.

9. For a turbine type power plant having a compressor, a combustion section and a turbine receiving the products of combustion discharging from the combustion section for driving said compressor, a source of fuel under pressure, connecting means interconnecting said source and said combustion section, fuel regulating means in said connecting means for controlling the flow of fuel therethrough, means responsive to a compressor discharge pressure, compressor inlet temperature, pressure drop across the burner and compressor speed for controlling said fuel regulating means, said last mentioned means including computating means for establishing a scheduled value in accordance with the expression $$\frac{\Delta P_b \theta^x}{P_3}$$

varying as a function of $$\frac{N}{\sqrt{\theta}}$$

where
- $N$ = speed of the compressor
- $\Delta P_b$ = desired pressure drop across the combustion section
- $\theta$ = compressor inlet temperature
- $P_3$ = compressor discharge pressure $$x = -\frac{K+1}{2K}\left[\frac{1+\frac{K-1}{2}M^2}{1-M^2}\right]$$

where
- $K$ = ratio of specific heat of the power plant working medium
- $M$ = a Mach number of the power plant working medium at the compressor outlet.

10. For a turbine type of power plant having a compressor, a burner, and a turbine receiving the products of combustion discharging from the burner for driving the compressor, a source of fuel under pressure, connection means interconnecting said source and said burner, fuel regulating means in said connection means for regulating the flow of fuel therein, means responsive to compressor inlet temperature, compressor speed and compressor discharge pressure for controlling said fuel regulating means, said means including computing mechanism for limiting the temperature of the working medium at the inlet of said turbine by establishing a scheduled value in accordance with the expression $$\frac{\Delta P_b \theta^x}{P_3}$$

where
- $\Delta P_b$ = desired pressure drop across the burner
- $\theta$ = compressor inlet temperature
- $x$ = a thermodynamic value of the power plant working medium
- $P_3$ = compressor discharge pressure said means also including additional computating mechanism for preventing surge at the compressor by establishing a scheduled value for satisfying the expression $$\frac{\Delta P_b}{P_3}$$

11. For a turbine type of power plant having a compressor, a heat source, and a turbine receiving the products of combustion discharging from the heat source for driving the compressor, a source of fuel under pressure, connection means interconnecting said source and said heat source, fuel regulating means in said connection means for regulating the flow of fuel therein, means responsive to compressor inlet temperature, compressor speed, the pressure drop across the heat source and compressor discharge pressure for controlling said fuel regulating means, said means including computing mechanism for limiting the temperature of the working medium at the inlet of said turbine by establishing a scheduled value in accordance with the expression $$\frac{\Delta P_b \theta^x}{P_3}$$

varying as a function of $$\frac{\overline{N}}{\sqrt{\theta}}$$

where
- $\Delta P_b$ = desired pressure drop across the burner
- $\theta$ = compressor inlet temperature
- $x$ = thermodynamic values of the power plant working medium
- $P_3$ = compressor discharge pressure
- $N$ = compressor speed said means also including additional computating mechanism for preventing surge at the compressor by establishing a scheduled value for satisfying the expression $$\frac{\Delta P_b}{P_3}$$

varying as a function of $$\frac{N}{\sqrt{\theta}}$$

12. A turbine type of power plant having a compressor, a burner, and a turbine receiving the products of combusion discharging from the burner for driving the compressor, a source of fuel under pressure, connection means interconnecting said source and said burner, fuel regulating means in said connection means for regulating the flow of fuel therein, means responsive to compressor inlet temperature, compressor speed and compressor discharge pressure for controlling said fuel regulating means, said means including computing mechanism for limiting the temperature of the working medium at the inlet of said turbine by establishing a scheduled value in accordance with the expression $$\frac{\Delta P_b \theta^x}{P_3}$$

where
- $\Delta P_b$ = desired pressure drop across the burner
- $\theta$ = compressor inlet temperature $$x = -\frac{K+1}{2K}\left[\frac{1+\frac{K-1}{2}M^2}{1-M^2}\right]$$

where
- $K$ = ratio of specific heat of the power plant working medium
- $M$ = a Mach number of the power plant working medium at the compressor outlet
- $P_3$ = compressor discharge pressure said means also including additional computating mechanism for preventing surge at the compressor by establishing a scheduled value for satisfying the expression $$\frac{\Delta P_b}{P_3}$$

References Cited by the Examiner

UNITED STATES PATENTS

| | | | |
|---|---|---|---|
| 2,592,385 | 4/1952 | Borden. | |
| 2,740,295 | 4/1956 | Perchonak | 60—39.28 X |
| 2,792,685 | 5/1957 | Constantino | 60—39.28 |
| 2,809,492 | 10/1957 | Arkawy | 60—39.28 |
| 2,857,739 | 10/1958 | Wright | 60—39.28 X |
| 2,970,436 | 2/1961 | Sims | 60—39.28 |
| 2,976,683 | 3/1961 | Flanagan et al. | 60—39.28 |
| 2,979,894 | 4/1961 | Zeisloft | 60—39.28 |
| 2,984,977 | 5/1961 | Embree | 60—39.28 |

OTHER REFERENCES

Sobey, Control of Aircraft and Missile Powerplants; New York and London, John Wiley and Sons, Inc.; received in Patent Office July 29, 1963, page 11 relied on.

JULIUS E. WEST, *Primary Examiner.*

UNITED STATES PATENT OFFICE
CERTIFICATE OF CORRECTION

Patent No. 3,295,315                                January 3, 1967

Louis A. Urban

It is hereby certified that error appears in the above numbered patent requiring correction and that the said Letters Patent should read as corrected below.

Column 14, line 75, after "pressure" insert -- drop --; column 15, line 24, for "engine" read -- power plant --; column 16, line 23, for "engine" read -- power plant --; line 47, for "K+1" read -- K-1 --; column 17, line 61, for "$\frac{}{\sqrt{\theta}}$" read -- $\frac{N}{\sqrt{\theta}}$ --.

Signed and sealed this 26th day of September 1967.

(SEAL)
Attest:

ERNEST W. SWIDER                               EDWARD J. BRENNER
Attesting Officer                                      Commissioner of Patents